United States Patent [19]

Volkert et al.

[11] B 4,013,806

[45] Mar. 22, 1977

[54] MANUFACTURE OF THIN LAYERS OF POLYURETHANE ELASTOMERS

[75] Inventors: Otto Volkert, Ludwigshafen; August Wigger, Frankenthal; Manfred Zuerger, Mannheim; Peter Richter, Ludwigshafen, all of Germany

[73] Assignee: BASF Aktiengesellschaft, Ludwigshafen (Rhine), Germany

[22] Filed: Dec. 4, 1973

[21] Appl. No.: 421,608

[44] Published under the second Trial Voluntary Protest Program on March 23, 1976 as document No. B 421,608.

[30] Foreign Application Priority Data

Dec. 4, 1972 Germany .......................... 2259360

[52] U.S. Cl. .................................. 427/54; 427/55; 427/385 B; 204/159.19; 260/859 R
[51] Int. Cl.² .......................................... B05D 3/06
[58] Field of Search ................. 117/93.31, 161 KP; 204/159.15, 159.19; 260/859 R; 427/54, 385, 55

[56] References Cited

UNITED STATES PATENTS

| | | | |
|---|---|---|---|
| 2,948,611 | 8/1960 | Barney ...................... | 260/859 R |
| 2,965,553 | 12/1960 | Dixon et al. .................. | 260/859 R |
| 3,008,917 | 11/1961 | Park et al. .................... | 260/859 R |
| 3,361,842 | 1/1968 | Applegath et al. ............. | 117/93.31 |
| 3,624,045 | 11/1971 | Stivers ........................ | 204/159.19 |
| 3,812,063 | 5/1974 | Kimura et al. .................. | 117/93.31 |

Primary Examiner—John H. Newsome
Attorney, Agent, or Firm—Johnston, Keil, Thompson & Shurtleff

[57] ABSTRACT

A process for the manufacture of thin layers based on polyurethane elastomers. A liquid reaction mixture essentially consisting of (A) polyesters, polyethers, polyester urethanes or polyether urethanes, all of which contain at least two hydroxyl groups in the molecule, and diisocyanates or (B) prepolymers obtained from the hydroxyl-containing compounds mentioned under (A) above with an excess of diisocyanates, said prepolymers containing at least two isocyanate groups in the molecule, and at least one of the compounds mentioned under (A) above which are capable of reacting with isocyanates, to which reaction mixture a minor quantity of substantially compatible monomers having at least two photocrosslinkable C—C multiple bonds and optionally a photopolymerization initiator have been added, is applied to a substrate to form a coating thereon, which coating is then gelled by irradiation and finally thermocured. The process of the invention is particularly suitable for the continuous manufacture of uniformly thin layers of soft polyurethane elastomer showing narrow tolerance limits.

17 Claims, No Drawings

MANUFACTURE OF THIN LAYERS OF POLYURETHANE ELASTOMERS

The present invention relates to a process for the manufacture of elastomeric polyurethane layers from a liquid mixture of starting materials, wherein an uncolored or colored liquid mixture of reactive polyurethane starting components is mixed with small amounts of photocrosslinkable monomers which, prior to thermocuring of the mixture of polyurethane starting components, are crosslinked by brief irradiation so as to gel the reaction mixture of polyurethane starting components and thus render the mixture non-fluid.

It is known to apply soft protective layers of abrasion resistant polyurethane to, say, conveyor belts or the inner surface of receptacles for mechanically aggressive materials by pouring or spraying to afford surface protection. In this method, the highly activated components are rapidly mixed at high temperatures in a mixing head and then immediately applied to the substrate by pouring or spraying, curing being largely complete at the time of application. A disadvantage of the prior art pouring method is the fact that the liquid starting mixture used in the manufacture of the polyurethane must be highly activated to ensure that it reacts as quickly as possible during and after application. Such activation and fast reacting properties are necessary to prevent the liquid reaction mixture from draining away from the substrate. However, strong activation causes distinct impairment of the resistance of the resulting shaped articles to hydrolyzing agents. Furthermore, strongly activated reaction mixtures are only capable of being poured to form layers having a minimum thickness of from about 3 to 4 mm, since the mixture crosslinks very quickly and its viscosity rises during pouring to such an extent that thinner layers cannot be formed. If less strongly activated, thin systems are used in order to obtain thinner layers, it is necessary to re-heat the reaction mixture in the layer, which is very likely to cause flow-off of the mixture. Another disadvantage of the prior art process is that the pot life and processing time and also the mixing time at specific processing temperatures must be very precise if good, reproducible results are to be obtained. The method of spray application also requires very precise formulation of the reaction mixture and activation thereof. Although this method does make it possible to apply thin layers having a thickness of about 0.5 mm, the resulting layers show great thickness variations due to the unevenness of spray application. Moreover, wastage is inevitable in the production of coatings by spraying, since it is not possible to restrict the area covered by the spray jet exactly.

It is also known to produce polyurethane layers by centrifugation with curing of the liquid starting mixture in a heated centrifuge. The drawback of this process is the size limitation imposed on the articles to be coated by the dimensions of the centrifuge. Furthermore, the centrifuge must be constantly re-filled and then emptied after centrifugation and curing, so that only a batchwise procedure is possible, this involving drawbacks such as time consumption, labor costs and a correspondingly relatively low output rate.

It is further known to manufacture polyurethane webs by a calendering process using thermoplastic polyurethanes. However, this process can only be carried out with polyurethanes having a high Shore hardness. Polyurethanes having a low Shore hardness can be processed on a calender either not at all or only with great difficulty on account of their softness and tackiness.

It is an object of the present invention to provide a simple process for the manufacture of approximately 0.2 to 5 mm thick layers or sheeting of soft polyurethane elastomers of uniform thickness by a casting process using the liquid reaction mixtures normally employed in the manufacture of such polyurethanes, which process may be carried out continuously and makes it possible to manufacture reproducible layers of predetermined thickness in said range of thicknesses with narrow tolerance limits.

We have found that this object may be achieved if the non-activated or only weakly activated liquid reaction mixture prepared for the manufacture of the polyurethane elastomers is mixed with minor quantities of a photocrosslinkable monomer and, preferably, a small amount of photopolymerization initiator before the mixture is poured onto an appropriate substrate such as a moving metal band, and if, after which pouring operation and spreading of the mixture over the desired area to give the desired thickness, the layer formed is irradiated, for example with ultraviolet light, at room temperature or above to photocrosslink the monomers in the reaction mixture so as to convert the reactants to a gel so that the reaction mixture may then be thermocured, for example by the use of infrared radiation, without the polyurethane reactants draining away from the substrate.

Thus the invention relates to a process for the manufacture of thin layers based on soft polyurethane elastomers by curing a liquid, polyurethane-elastomer-forming reaction mixture essentially consisting of A. polyesters, polyethers, polyester urethanes and/or polyether urethanes containing at least two hydroxyl groups in the molecule and, optionally, diols and/or diamines (A 1) and diisocyanates (A 2) or B. prepolymers of the hydroxyl-containing compounds mentioned under (A) above and diisocyanates (B 1), which prepolymers have at least two isocyanate groups in the molecule, and at least one of the compounds capable of reaction with isocyanates mentioned under (A) above (B 2), optionally in the presence of usual activators for the isocyanate reaction with heating of the mixture, wherein the liquid reaction mixture, to which a minor quantity of substantially compatible monomers having at least two photocrosslinkable C—C multiple bonds and, optionally, a photopolymerization initiator have been admixed prior to application to the substrate, is applied to a substrate to form a layer thereon, which layer is irradiated to effect photocrosslinking of the monomers and gelling of the layer, whereupon the layer is cured by heating.

The process of the invention makes it possible to produce, in a simple manner, layers of elastomeric polyurethanes showing small thickness variations and starting from liquid components, in a continuous operation. No activation or only slight activation of the starting components by the addition of catalysts for the isocyanate reaction is required to raise the viscosity of the mixture, since the photocrosslinking of the added monomers as effected in the process of the invention provides sufficient fixation of the reactants in the layer for the execution of thermocuring even in the case of an inclined substrate without the reactants showing any tendency to flow on the substrate.

Suitable substrates for the layer to be applied are for example panels, rollers or webs (bands), preferably endless webs of materials, such as metals or plastics materials which are capable of withstanding a temperature of from about 90° to 120°C. Particularly suitable are metal bands and plastics sheeting, for example steel bands or polyester sheeting such as polyethylene terephthalate sheeting, these being most conveniently used in the form of endless bands. The width of the substrates may vary from a few centimeters to several meters, primarily depending on the width of the pourer.

The liquid reaction mixture to be poured onto the substrate essentially consists of 1. the known reactants for the manufacture of soft polyurethane elastomers such as are described for example in Saunders-Frisch "Polyurethanes", New York, 1962/1964, particularly in Chapter IX in Part II, and optionally containing small amounts of an activator for the isocyanate reaction particularly with the polyfunctional hydroxyl compounds, and
2. monomers having at least two photocrosslinkable C—C multiple bonds and preferably a photopolymerization initiator for photocrosslinking of the layer after it has been applied to the substrate.

Particularly suitable reactants for the polyurethane elastomer are mixtures (A) of (A 1). polyesters (A 11) or polyethers (A 12) containing at least two hydroxyl groups and having a molecular weight of from about 500 to 10,000 and/or hydroxyl-containing reaction products (A 13) of said products (A 11) and/or (A 12) with a molar deficiency of a diisocyanate, based on the number of moles of hydroxyl groups in said products (A 11) or (A 12) (in particular with from about 0.1 to 0.5 mole of diisocyanate per mole of hydroxyl groups in product (A 11) and/or (A 12) and, optionally, additional polyalcohols, in particular aliphatic, low molecular weight diols and/or diamines, and A 2. diisocyanates or mixtures (B) of B 1. prepolymers obtained from the said polyols (A 1) and in particular the polyester and/or polyether polyols (A 11) and (A 12) with a molar excess of diisocyanates (based on NCO/OH ratio), which prepolymers contain at least two isocyanate groups in the molecule, and B 2. at least one of the compounds mentioned under (A 1) above.

It is seen that higher molecular weight OH group-containing or NCO group containing compounds are reacted and crosslinked in known manner by the addition of lower molecular weight diisocyanates or polyols as so-called crosslinkers. The following comments relate to the preferred mixtures.

The polyester polyol (A 11) should, when mixed with the other polymeric components of the reaction mixture, be adequately pourable, i.e. the reaction mixture should have a viscosity at room temperature or over a range of from 0° to 60°C of from 500 to 2,000 centipoise and preferably from 10,000 to 200,000 centipoise. Useful polyester polyols have at least two free hydroxyl groups and conveniently a molecular weight of from about 500 to 10,000 and preferably from 1,000 to 5,000. They are preferably derived from saturated aliphatic difunctional acids of from 4 to 12 carbon atoms, i.e. dicarboxylic acids from succinic acid to dodecanedioic acid, of which the most usual is adipic acid, and diols of from 2 to 10 carbon atoms, to which small amounts of triols may have been added and the chain of which may be interrupted by hetero atoms such as oxygen or sulfur. The acid number of these polyesters should preferably be not more than 5, and the hydroxyl number is preferably equivalent to average molecular weights of from 1,000 to 5,000.

In place of polyester polyols or in admixture therewith, polyether polyols (A 12) having a molecular weight of from about 500 to 10,000 and preferably from 1,000 to 5,000 may be used. Advantageous products of this kind are condensation products or polymers obtained from ethylene and/or propylene glycol or ethylene oxide and/or propylene oxide-1,2 and/or other diols, of which the hydroxyl number preferably corresponds to an average molecular weight of from about 1,000 to 5,000 and of which the chain may be interrupted by hetero atoms such as sulfur and silicon.

From the abovementioned polyester and/or polyether polyols it is possible to prepare a prepolymer by adding a deficiency of diisocyanate (based on the NCO/OH ratio) to give a hydroxyl-containing polyurethane (A 13). This method is advantageous when the low-viscosity components of a polyurethane having good end properties are to be "thickened" to improve the pourability. To this end, a quantity of from 10 to 50% and preferably of from 20 to 30% of the stoichiometric amount of diisocyanate is particularly advantageous.

Of course, the polymeric starting components used may consist of the prepolymers of polyester and/or polyether polyols and diisocyanates (B 1). The prepolymers may be prepared in known manner, conveniently by reacting the polyols with about twice the molar amount of diisocyanates based on one mole of hydroxyl groups in the polyester or polyether polyols. In this case, further crosslinking occurs, also in known manner, by adding polyols or diamines, preferably diols.

The diisocyanate (A 2) used as crosslinker and preferably having from 6 to 30 carbon atoms may be an aliphatic diisocyanate such as hexamethylene diisocyanate, decamethylene diisocyanate or dodecamethylene diisocyanate or a cycloaliphatic diisocyanate such as dicyclohexylmethane-4,4'-diisocyanate or 3,5,5-trimethylcyclohexane-1,3-diisocyanate or an aromatic diisocyanate such as 2,4- or 2,6-toluenediisocyanate or diphenylmethane-4,4'-diisocyanate. However, the use of aliphatic or cycloaliphatic diisocyanates in place of aromatic diisocyanates is advantageous in that polyurethanes made from aromatic diisocyanates readily tend to yellow when exposed to light and thus make the inclusion of ultraviolet absorbents necessary if the yellow discoloration is undesirable.

Crosslinking of the prepolymer (B 1) containing free isocyanate groups is most suitably effected by diols such as saturated aliphatic cycloaliphatic or aromatic glycols. Typical of the first category are butanediol-1,4, hexanediol-1,6 and octanediol-1,8. The chain of the diols may, if desired, be interrupted by hetero atoms such as oxygen or sulfur, as in the case of diethylene glycol, triethylene glycol and thiodiglycol. Suitable cycloaliphatic and aromatic glycols are for example 1,3- or 1,4-bis-(hydroxymethyl)-cyclohexane and 1,3- or 1,4-bis-(hydroxymethyl)-benzene.

For the purposes of activation, the mixture may also contain a small amount of a catalyst which accelerates the polyurethane addition reaction. However, in the process of the invention, much smaller qunatities are adequate and advantageous than are used in conventional casting processes. An example is N,N'-endoethylenepiperazine which is used in amounts of from 0.003 to 0.015% by weight of the weight of the final mixture, to give adequate activation. Where use is made of metal catalysts such as dibutyl tin dilaurate, amounts of from 0.001 to 0.005% by weight are sufficient to afford adequately rapid thermocuring of the mixture after casting. The addition of activator may be omitted altogether, this having the advantage of a long pot life of the mixture, although a longer curing time of the cast layer must be accepted. Preferably, the amount of catalyst added is that giving a degree of activation corresponding to that obtained with the above amounts of N,N'-endoethylene-piperazine or the above amounts of dibutyl tin dilaurate. In general the amount of catalyst is from about 0.001 to 0.03% by weight.

Suitable monomers having photocrosslinkable C—C multiple bonds which can be added to the reaction mixture prior to application to produce photochemical crosslinking and gelling thereof, preferably together with photopolymerization initiators, are all monomers having C—C multiple bonds and substantially compatible with the reaction mixture, provided said monomers are capable of photocrosslinking or photopolymerizing in the presence of a photopolymerization initiator when irradiated by electromagnetic radiation. They are added to the reaction mixture of starting components for forming the polyurethane elastomer in minor quantities so that irradiation with actinic light produces a linkage system sufficient to prevent the polyurethane-forming components contained in the mixture from flowing even when the substrate is inclined or the irradiated mixture is heated to about 100°C, whilst the physical properties of the thermocured polyurethanes are not substantially affected by the content of photocrosslinked monomers therein unless this is intended. It may be generally stated that the minimum amount of monomer is chosen so that the reaction mixture, after irradiation, no longer flows when heated to the desired curing temperature of the polyurethane reactants, whilst the maximum amount of monomer is conveniently such as to give an irradiated and cured sheet which is still elastomeric and has a Shore hardness A of not more than 70° and preferably of from 20 to 40°.

The monomers are conveniently added in amounts giving the reaction mixture a content of from about 0.2 to about 5% by weight and perferably from about 0.4 to 1.4% by weight of double bonded carbon atoms (C=C). The added weights of monomer are thus dependent on the molecular weight of the monomers used and are preferably not more than about 10% by weight. We have found that additions of only about 2% by weight of monomer are often sufficient to give adequate gelling of the reaction mixture on irradiation.

Particularly suitable monomers are those having at least two C—C double bonds which may be crosslinked or photopolymerized by irradiation optionally in the presence of a photoinitiator, for example polyolefinically unsaturated carboxylates, e.g. diesters of aliphatic or cycloaliphatic diols of preferably from 2 to 10 and in particular from 2 to 6 carbon atoms such as ethylene glycol, propylene glycol, butanediol-1,4, hexanediol-1,6 and cyclohexanediol-1,4 and monoethylenically unsaturated monocarboxylic acids of from 3 to 5 carbon atoms such as acrylic and methacrylic acids, e.g. ethyleneglycol diacrylate, ethyleneglycol dimethacrylate, butanediol-1,4 diacrylate, butanediol-1,4 dimethacrylate, hexanediol-1,6 diacrylate and cyclohexanediol-1,4 diacrylate, or triesters of aliphatic triols of from 3 to 10 carbon atoms such as glycerol and trimethylpropane and monoethylenically unsaturated monocarboxylic acids of from 3 to 5 carbon atoms such as acrylic acid and methacrylic acid, also polyfunctional vinyl esters of polycarboxylic acids, in particular divinyl esters of aliphatic or aromatic, preferably $C_{4-8}$ dicarboxylic acids optionally containing an olefinic double bond, for example divinyl oxalate, divinyl maleate and divinyl fumarate, vinyl esters of monoolefinically unsaturated preferably $C_{3-5}$ monocarboxylic acids, for example vinyl methacrylate, vinyl crotonate and vinyl acrylate, allyl carboxylic esters, particularly those of saturated or monoolefinically unsaturated $C_{3-8}$ dicarboxylic acids, for example diallyl phthalate, allyl acrylate, allyl methacrylate, diallyl maleate, diallyl oxalate, diallyl adipate and allyl α-chloroacrylate. Such unsaturated carboxylates usually have two or three olefinic double bonds and from 5 to 20 and in particular from 5 to 14 carbon atoms and may or may not be derived from substituted carboxylic acids, e.g. halocarboxylic acids, particularly α-chloro-substituted monoolefinically unsaturated monocarboxylic acids.

Other polyolefinically unsaturated monomers which are suitable are polyolefinically unsaturated carbonamides, e.g. methylene-bisacrylamide and diamides of acrylic or methacrylic acid and diamines, particularly aliphatic diamines containing from 2 to 6 carbon atoms, such as N,N'-ethylene-bis-acrylamide, N,N'-ethylene-bis-methacrylamide and N,N'-hexamethylene-bis-acrylamide, and also diethers of aliphatic or cycloaliphatic diols of from 2 to 10 and preferably from 2 to 6 carbon atoms, such as ethylene glycol and butanediol-1,4, and N-methylolacrylamide or N-methylolmethacrylamide.

Instead of using only monomers having at least two C—C multiple bonds it is possible, in certain cases, particularly for the purpose of achieving better compatibility, to use mixtures of monomers containing at least 50% by weight of such monomers and also from 0.1 to 50% by weight of photocopolymerizable monoethylenically unsaturated monomers such as acrylates and/or methacrylates of alkanols of from 1 to 8 carbon atoms and in particular of from 1 to 4 carbon atoms, acrylates and/or methacrylates of cycloalkanols of 5 or 6 carbon atoms in the ring or of polyhydric, particularly dihydric or trihydric, alcohols of from 2 to 6 carbon atoms, and also acrylamides and/or methacrylamides or their N-methylol compounds or their N-methylol ethers of alcohols of from 1 to 4 carbon atoms. Examples of suitable monomers are the methyl, ethyl, n-propyl, n-butyl, isobutyl, cyclohexyl and 2-ethylhexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylolacrylamide, N-methylolmethacrylamide, N-methylolacrylamide methyl ether and N-methylolmethacrylamide n-butyl ether. These monomers may also be advantageously used in admixture with each other.

The reaction mixture of the polyurethane starting compounds and photocrosslinkable monomer(s) may advantageously have added thereto small amounts of photopolymerization initiators, i.e. compound which dissociate into free radicals under the action of light or UV irradiation or which produce free radicals by reactions caused by the action of light or UV irradiation, which radicals initiate polymerization. Examples of suitable photoinitiators are vicinal ketaldonyl compounds such as diacetyl and benzyl, α-ketaldonyl alcohols such as benzoin, acyloin ethers such as benzoin methyl ether, benzoin isopropyl ether and α-methylolbenzoin methyl ether and α-substituted aromatic acyloins such as α-methylbenzoin, aromatic ketones and aldehydes such as benzophenone, propiophenone and benzaldehyde. The photopolymerization initiators are generally added in amounts of from 0.001 to 10% and preferably from 0.01 to 5% by weight of the monomers.

Mixing of the components of the reaction mixture, which is advantageously carried out at room temperature or, depending on the degree of activation, at a temperature of up to about 60°C, is conveniently carried out, in the process of the invention, in a mixing chamber to which the individual components are metered by way of metering pumps. Care must be taken to ensure that the components used are free of bubbles and water. If the monomer to be used is liquid, it may be metered to the mixing chamber together with the dissolved photoinitiator. If it is solid, it may be predissolved in, for example, the polyol component for the polyurethane, as may also the photoinitiator and the activator, the resulting solution then being metered to the mixing chamber. Less suitable than a mixing chamber is the so-called mixing head conventionally used in the manufacture of polyurethane, since the extremely short mixing times achieved in this mixing head are often inadequate in the process of the invention for mixing the components of the reaction mixture which are viscous at room temperature.

The reaction mixture should preferably have a viscosity of at least 500 centipoise and must be capable of spreading out to thin layers on pouring. Pouring of the reaction mixtures may be carried out in conventional manner using conventional equipment.

As mentioned above, the reaction mixture may be poured onto substrates such as rollers, panels and bands. The substrates may be flexible or rigid and they may or may not reflect the actinic radiation or infrared radiation. Suitable substrates are for example of paper, rubber, textiles, plastics and metals and are generally in the form of curved or flat objects or in web form. Cylinders and other round objects may also be coated with polyurethane elastomers by the process of the invention, provided they present a uniform area to the pourer and can pass beneath it. The cured reaction mixture generally adheres well to these substrates. If the process is to be used for the manufacture of self-supporting polyurethane elastomer sheeting, it is necessary to use substrates from which the cured sheeting may be readily removed and wound onto rolls, examples of such substrates being metal or plastics substrates coated with polytetrafluoroethylene or silicon rubber. We prefer to use endless metal bands which may or may not have been coated in the manner indicated and preferably have widths of from about 0.2 to 2 meters.

According to the process of the invention, the coating of reaction mixture is photochemically pre-crosslinked or gelled by means of electromagnetic radiation having a wavelength of less than 0.7 and preferably less than 0.39 μm. Suitable radiation is for example light from mercury vapor lamps, xenon lamps and fluorescent tubes. If high-energy radiation is used, for example light having a wavelength of less than 0.3 μm, it is not necessary to include photopolymerization initiators in the reaction mixture. However, the use of photoinitiators is usually necessary if irradiation is carried out with light in the visible and ultraviolet regions of the spectrum which has a wavelength which is longer than that of the light absorbed by the polymerizing materials having C—C double bonds. The distance between the coating and the source of light during exposure is conveniently from 3 to 15 cm and preferably from 5 to 10 cm.

The step of photocrosslinking or gelling of the reaction mixture is initiated during the final stage of pouring or immediately thereafter and is generally complete shortly after, so that the reaction mixture can no longer flow even if it previously had a relatively low viscosity.

Photocrosslinking or gelling of the reaction mixture is followed by thermocuring of the polyurethane-forming reactants by heating the layer, for example by passing it through a heating zone. Preferably, this thermocuring is effected by irradiation with infrared light coming from an infrared heater and having a wavelength of generally from 1 to 50 μm and preferably from 2 to 20 μm. The surface temperature of the cast layer is generally from about 90° to 150°C and preferably from 110° to 130°C. The residence time of the gelled layer in the heating zone is generally from about 5 to 30 minutes, depending on the temperatures used and the nature of the layer and its content of activator for the isocyanate reaction. A heating period of 15 minutes is usually sufficient.

In an advantageous continuous embodiment of the process of the invention, the substrate web (sheeting or metal band) is transported from a haul-off roll and passed over a casting roller. The reaction mixture is poured from a mixing chamber onto the moving substrate through a pourer to form a coating of specific thickness. Within the pouring zone and immediately downstream thereof, the layer is irradiated with ultraviolet light to effect photocrosslinking and gelling of the layer, and the moving substrate web carrying the gelled layer then passes to a heating zone in which thermocuring is effected by infrared light and/or hot air. The cured elastomeric polyurethane layer is then wound onto a core or, in the case of the manufacture of self-supporting sheeting, it is continuously peeled off the substrate.

The process of the invention provides a simple way of continuously producing polyurethane layers having thicknesses of from about 0.1 to 10 mm and preferably from 0.2 to 5 mm, which thicknesses are uniform within very narrow tolerance limits. Coating of, say, rollers is also possible in this simple manner. The process is also suitable for producing coatings on metal surfaces, e.g. in the manufacture of lined metal vessels such as are required for transporting purposes, and for coating conveyor belts, carpet backings and webs of leather, i.e. for general application of uniform polyurethane layers required to show good flexibility, adequate mechanical strength and, in particular, good abrasion resistance.

In the following Examples the parts are by weight.

EXAMPLE 1

In a mixing chamber provided with stirrer and connected to metering pumps by three feed lines, 30 parts of 1,1,1-trimethylolpropane triacrylate containing 1 part of dissolved benzoin methyl ether and, separately, 90 parts of toluylene diisocyanate are metered to 1,000 parts of a dry, bubble-free commercial hydroxyl-containing aliphatic polyester having a molecular weight of about 2,000 (DESMOPHEN 2200 sold by Farbenfabriken Bayer AG, Leverkusen). After mixing at room temperature, the reaction mixture, which has a pot life of about 5 hours at 20°C, is transferred to a pourer connected to the mixing chamber and is poured onto a substrate consisting of polyethylene terephthalate sheeting to form a coating thereon having a thickness of about 2 mm. Within the pouring zone and immediately downstream thereof, the coating on the moving substrate is irradiated for about 30 seconds by a 1 kw mercury high-pressure lamp to cause gelling of the coating. After irradiation, the coating is tacky but can no longer flow. The moving substrate carrying the coating then leaves the irradiating zone to pass immediately to a heating zone for thermocuring of the coating by infrared radiation for about 30 minutes at about 130°C. The polurethane layer is cooled on leaving the heating zone and is then clear and elastic and is free from bubbles and shows maximum thickness variations of ±1%, except for a very narrow marginal region. The coating has a Shore hardness A of 40°.

EXAMPLE 2

Example 1 is repeated except that 0.05 part of dibutyl tin dilaurate is also added to the reaction mixture in the mixing chamber. The pot life of the reaction mixture is about 40 minutes. The layer is irradiated as described in Example 1 and thermocured for about 10 minutes at 130°C. There is obtained a clear, flexible layer having a Shore hardness A of 40°.

EXAMPLE 3

1,000 Parts of the hydroxyl-containing polyester used in Example 1 are mixed with 0.1 part of N,N'-endoethylene piperazine and 30 parts of toluylene diisocyanate and are stirred for 30 minutes at 80°C. After cooling to room temperature, the viscosity of the mixture is found to have risen to about 150,000 centipoise. To this mixture there are added, in the mixing chamber, 60 parts of toluylene diisocyanate and 30 parts of 1,1,1-trimethylolpropane triacrylate containing 1 part of dissolved α-methylolbenzoin methyl ether as photopolymerization initiator, the resulting mixture being stirred. This highly viscous reaction mixture is poured onto a substrate to give coatings having a thickness of 5 mm and irradiated as described in Example 1 and then thermocured with hot air at 130°C for 10 minutes. The Shore hardness A of the resulting clear and flexible coating of very uniform thickness is 40°.

EXAMPLE 4

Example 2 is repeated except that in place of 90 only 75 parts of toluylene diisocyanate are added. The resulting flexible polyurethane layer has, after thermocuring, a Shore hardness A of 20°.

EXAMPLE 5

Example 2 is repeated except that in place of 90 parts of toluylene diisocyanate 62 parts of hexamethylene diisocyanate are added and the thermocuring step following photocrosslinking is effected for 15 minutes at 130°C. The resulting polyurethane coating has a Shore hardness A of 39°.

EXAMPLE 6

Example 2 is repeated except that the reaction mixture is poured onto a steel substrate which is inclined at an angle of 70°, the mixture being irradiated immediately on pouring. The liquid reaction mixture shows no further movement on the substrate on leaving the pouring zone and no flow of the mixture is seen to take place in the subsequent thermocuring stage.

EXAMPLE 7

Example 3 is repeated except that the reaction mixture is poured onto a continuously moving endless steel band which has been coated is then peeled off the endless steel band to form a web of sheeting which is then wound onto a roll.

EXAMPLE 8

1,000 Parts of a hydroxyl-containing polyether based on a reaction product of 1,1,1-trimethyolpropane with excess propylene oxide-1,2 (PLURACOL TP 4040 sold by BASF-Wyandotte Corporation, Wyandotte, Michigan, U.S.A.) are mixed with 120 parts of toluylene diisocyanate and 0.1 part of N,N'-endoethylene piperazine, and to this mixture there are then metered, in a mixing chamber, 30 parts of 1,1,1-trimethylolpropane triacrylate containing 1 part of dissolved benzoin methyl ether, and separately 52 parts of a hydroxylcontaining propylene oxide-1,2 polymer having a functionality of 2 and a molecular weight of about 1,000 (PLURACOL P 1010 sold by BASF-Wyandotte Corporation) with stirring. The reaction mixture is poured onto a continuously moving steel belt to form a coating having a thickness of 2 mm, which is then immediately irradiated for 40 seconds with a 1 kw mercury high-pressure lamp to cause photocrosslinking, i.e. gelling of the coating, which is then immediately thermocured in a heating zone for about 15 minutes at about 130°C using infrared radiation. There is obtained a soft elastic polyurethane layer of very uniform thickness and having a Shore hardness A of 15°.

EXAMPLE 9

Example 2 is repeated except that in place of 30 parts of 1,1,1-trimethylolpropane triacrylate 40 parts of triethylene glycol diacrylate are used. The resulting polyurethane layer of uniform thickness has a Shore hardness A of 40°.

EXAMPLE 10

Example 9 is repeated except that in place of triethylene glycol diacrylate an equal weight of butanediol-1,4 diacrylate is used. After thermocuring, the resulting clear layer has a Shore hardness A of about 40°.

EXAMPLE 11

1,000 Parts of a hydroxyl-containing liquid polyether having a hydroxyl number of 58 and based on a reaction product of propylene oxide-1,2 with glycerol (PLURACOL GP 3030 sold by BASF-Wyandotte Corporation) are mixed with 127 parts of a reaction product of polyoxypropylene with saccharose having an OH number of 525 (PLURACOL SP 670 sold by BASF-Wyandotte Corporation) and 0.1 part of N,N'-endoethylene piperazine. To this there are metered, in a mixing chamber, 193 parts of 2,4-toluylene diisocyanate and 40 parts of hexanediol-1,6 diacrylate containing 2 parts of dissolved benzoin methyl ether, with stirring. The reaction mixture is poured onto a continuously moving web of sheeting to form a coating of 2 mm in thickness, and is then gelled and thermocured in the manner described in Example 8. The elastic thermocured coating has a Shore hardness A of 53° and its thickness is uniform within very narrow tolerance limits.

EXAMPLE 12

In 1,000 parts of a dehydrated hydroxy-containing polyether based on a reaction product of 1,1,1-trimethylolpropane with excess propylene oxide-1,2 (PLURACOL TP 740 sold by BASF-Wyandotte Corporation) there are dissolved 40 parts of bis-(N-methylolacrylamide)ethylene glycol ether (bisether from 1 mole ethylene glycol and 2 moles of N-methylolacrylamide), 2 parts of benzoin methyl ether and 0.3 part of lead octoate. To this solution there are added, in a mixing chamber, 358 parts of 2,4-toluylene diisocyanate with stirring and the reaction mixture is processed as described in Example 8 to give a coating having a thickness of 0.5 mm which is gelled and cured so that the final elastic coating has a Shore hardness A of 66°.

EXAMPLES 13 to 16

Example 11 is repeated except that in place of hexanediol-1,6 diacrylate the following monomers are added:
Example 13: pentaerythritol tetraacrylate
Example 14: 1,1,1-trimethylolpropane triacrylate
Example 15: ethylene-bis-acrylamide
Example 16: diethylene glycol diacrylate.

In all cases final coatings having a very uniform thickness were obtained.

We claim:

1. In a process for the formation on a substrate of thin polyurethane elastomeric layers of from about 0.2 to 5 mm thickness having a Shore hardness A of not more than 70° by curing a liquid polyurethane-elastomer-forming reaction mixture which consists essentially of
   A. at least one polymeric material containing at least two hydroxyl groups in the molecule which are capable of reacting with isocyanates, said polymeric material being selected from the group consisting of polyesters, polyethers, polyester urethanes and polyether urethanes; and
   B. diisocyanates or prepolymers drived from at least one of the hydroxyl-containing compounds mentioned under (A) above and diisocyanates, which prepolymers contain at least two isocyanate groups in the molecule,
which curing is effected by heating said mixture, the improvement which comprises: incorporating into said reaction mixture a minor amount of substantially compatible monomers having at least two photocrosslinkable double bonded carbon atoms prior to applying said mixture to the substrate; pouring said mixture onto said substrate to form a layer thereon; irradiating said layer to effect photocrosslinking of the monomers and gelling of the layer; and thereafter heating the layer to form a polyurethane elastomer.

2. A process as claimed in claim 1, wherein the component (A) additionally contains at least one compound selected from the group consisting of diols and diamines.

3. A process as claimed in claim 1, wherein the liquid reaction mixture additionally contains a conventional activator for the formation of polyurethane.

4. A process as claimed in claim 1, wherein a photopolymerization initiator is added to the liquid reaction mixture before the latter is applied to the substrate.

5. A process as claimed in claim 1, wherein the monomer-containing mixture is applied to a continuously transported substrate to form a coating thereon.

6. A process as claimed in claim 1, wherein the applied coating is exposed to irradiation to cause photocrosslinking of the monomers.

7. A process as claimed in claim 1, wherein the applied coating is exposed, after gelling, to infrared radiation to cause thermocuring of the coating.

8. A process as claimed in claim 1, wherein the coating is manufactured by pouring a liquid reaction mixture having a viscosity of at least 500 centipoise.

9. A process as claimed in claim 1, wherein the liquid reaction mixture has a content of from about 0.2 to about 5% by weight of photocrosslinkable double bonded carbon atoms.

10. A process as claimed in claim 1, wherein the liquid reaction mixture contains from about 0.001 to 0.03% by weight of conventional activators for the hydroxyl/isocyanate reaction.

11. A process as claimed in claim 4, wherein the liquid reaction mixture contains from about 0.001 to about 10% by weight of the weight of monomers of a photopolymerization initiator.

12. A process as claimed in claim 1, wherein the liquid reaction mixture has a viscosity of from 10,000 to 200,000 centipoise at temperatures ranging from 0° to 60°C.

13. A process as claimed in claim 1, wherein the polyester or polyether in component (A) and containing at least two hydroxyl groups in the molecule has molecular weight of from 500 to 10,000.

14. A process as claimed in claim 1, wherein the monomer having at least two photocrosslinkable double bonded carbon atoms is a polyolefinically unsaturated carboxylate.

15. A process as claimed in claim 14, wherein the polyolefinically unsaturated carboxylate is at least one compound selected from the group consisting of diesters of a $C_{2-6}$ aliphatic diol and acrylic or methacrylic acid, triesters of a $C_{3-10}$ aliphatic triol and acrylic or methacrylic acid, divinyl esters of $C_{4-8}$ dicarboxylic acids, diallyl esters of $C_{4-8}$ dicarboxylic acids, vinyl esters and allyl esters of $C_{3-5}$ olefinically unsaturated monocarboxylic acids.

16. A process as claimed in claim 1, wherein the radiation used for photocrosslinking the monomers and gelling the coating has a wavelength of less than 0.7 $\mu$m.

17. Polyurethane elastomer layers whenever prepared by the process claimed in claim 1.

* * * * *